(12) United States Patent
Parker et al.

(10) Patent No.: US 11,685,518 B2
(45) Date of Patent: Jun. 27, 2023

(54) MEASURING WEIGHT AND BALANCE AND OPTIMIZING CENTER OF GRAVITY

(71) Applicant: GE Aviation Systems Limited, Cheltenham (GB)

(72) Inventors: Edward Parker, Cheltenham (GB); Stefan Alexander Schwindt, Cheltenham (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 0 days.

(21) Appl. No.: 17/833,067

(22) Filed: Jun. 6, 2022

(65) Prior Publication Data

US 2022/0306286 A1    Sep. 29, 2022

Related U.S. Application Data

(63) Continuation of application No. 16/539,424, filed on Aug. 13, 2019, now Pat. No. 11,377,203.

(30) Foreign Application Priority Data

Sep. 3, 2018  (GB) ..................... 1814286

(51) Int. Cl.
*B64C 17/02* (2006.01)
*B64C 25/32* (2006.01)
(Continued)

(52) U.S. Cl.
CPC ............. *B64C 17/02* (2013.01); *B64C 25/32* (2013.01); *B64D 31/06* (2013.01); *B64D 45/00* (2013.01);
(Continued)

(58) Field of Classification Search
CPC ......... B64C 17/02; B64C 17/10; B64C 25/32; B64C 25/001; G01M 1/127; G01M 1/125;
(Continued)

(56) References Cited

U.S. PATENT DOCUMENTS 2,443,045 A * 6/1948 Bender, Jr. ............ G01M 1/125
177/136
3,426,586 A * 2/1969 Kadlec ................... G01G 19/07
177/136

(Continued)

FOREIGN PATENT DOCUMENTS

CN           505109 A      5/1939
CN        101151644 A      3/2008
(Continued)

OTHER PUBLICATIONS

Non-Final Office Action received for U.S. Appl. No. 16/539,424 dated Jun. 25, 2021, 21 pages.
(Continued)

*Primary Examiner* — Mussa A Shaawat
(74) *Attorney, Agent, or Firm* — Amin, Turocy & Watson, LLP

(57) ABSTRACT

Systems, computer-implemented methods and/or computer program products that facilitate measuring weight and balance and optimizing center of gravity are provided. In one embodiment, a system 100 utilizes a processor 106 that executes computer implemented components stored in a memory 104. A compression component 108 calculates compression of landing gear struts based on height above ground of an aircraft. A gravity component 110 determines center of gravity based on differential compression of the
(Continued)

landing gear struts. An optimization component 112 automatically optimizes the center of gravity to a rear limit of a center of gravity margin.

20 Claims, 11 Drawing Sheets

(51) Int. Cl.
  *B64D 31/06* (2006.01)
  *B64D 45/00* (2006.01)
  *F02C 9/50* (2006.01)
  *G01G 19/07* (2006.01)
  *G01M 1/12* (2006.01)

(52) U.S. Cl.
  CPC .............. *F02C 9/50* (2013.01); *G01G 19/07* (2013.01); *G01M 1/127* (2013.01)

(58) Field of Classification Search
  CPC ........ G01G 19/07; B64D 45/00; B64D 31/06; F02C 9/50
  See application file for complete search history.

(56) References Cited

U.S. PATENT DOCUMENTS

| | | | |
|---|---|---|---|
| 4,110,605 A | 8/1978 | Miller | |
| 4,622,639 A | 11/1986 | Adelson et al. | |
| 4,937,754 A * | 6/1990 | Buisson | G01M 1/127 73/65.06 |
| 4,949,269 A * | 8/1990 | Buisson | G01M 1/127 244/76 R |
| 5,214,586 A * | 5/1993 | Nance | G01G 19/07 701/16 |
| 5,257,756 A * | 11/1993 | Patzig | G01G 19/07 244/103 R |
| 5,321,945 A * | 6/1994 | Bell | F02C 7/22 60/734 |
| 5,327,347 A * | 7/1994 | Hagenbuch | G07C 5/008 701/50 |
| 5,521,827 A * | 5/1996 | Lindberg | G01G 19/07 73/65.06 |
| 5,548,517 A * | 8/1996 | Nance | G01M 1/125 702/175 |
| 5,784,945 A * | 7/1998 | Krone | F15B 19/00 91/361 |
| 5,826,666 A * | 10/1998 | Tozawa | E02F 3/437 172/7 |
| 6,032,090 A | 2/2000 | Von Bose | |
| 6,128,951 A * | 10/2000 | Nance | G01M 1/125 702/175 |
| 6,308,131 B1 | 10/2001 | Fox | |
| 6,353,793 B1 * | 3/2002 | Godwin | G01M 1/125 701/120 |
| 6,600,991 B1 * | 7/2003 | Jardin | G06Q 10/047 701/411 |
| 7,193,530 B2 * | 3/2007 | Nance | B64F 5/60 340/960 |
| 7,274,309 B2 * | 9/2007 | Nance | B64D 45/00 340/960 |
| 7,274,310 B1 * | 9/2007 | Nance | G08B 21/00 340/960 |
| 7,281,418 B2 * | 10/2007 | Mardirossian | G01G 19/07 73/65.06 |
| 7,894,961 B2 * | 2/2011 | Blackburn | G07C 5/085 377/28 |
| 7,967,244 B2 * | 6/2011 | Long | G01G 19/07 244/102 R |
| 8,042,765 B1 * | 10/2011 | Nance | B64D 45/0005 244/100 R |
| 8,180,504 B1 * | 5/2012 | Nance | G05D 1/0083 701/4 |
| 8,543,322 B1 | 9/2013 | Nance | |
| 8,565,965 B2 * | 10/2013 | Nance | B64F 5/60 244/50 |
| 8,774,752 B1 | 7/2014 | Akcasu et al. | |
| 8,814,096 B2 * | 8/2014 | Spottiswoode | G01M 1/127 244/135 C |
| 8,818,696 B2 * | 8/2014 | Klooster | G08G 5/0039 701/120 |
| 8,963,353 B1 * | 2/2015 | Ekanayake | F03D 7/0284 290/43 |
| 9,406,237 B2 * | 8/2016 | Downey | G05D 1/0022 |
| 9,583,007 B2 * | 2/2017 | Ubhi | B60L 50/52 |
| 9,805,595 B1 | 10/2017 | Liebinger Portela et al. | |
| 9,927,319 B2 * | 3/2018 | Nance | G01G 19/07 |
| 10,023,323 B1 * | 7/2018 | Roberts | B64C 39/024 |
| 10,269,257 B1 * | 4/2019 | Gohl | B64C 39/024 |
| 10,518,872 B2 * | 12/2019 | Ribarov | B64D 37/04 |
| 2003/0033798 A1 * | 2/2003 | Dickau | F02K 3/075 60/228 |
| 2005/0051666 A1 * | 3/2005 | Lee | B64C 17/10 244/10 |
| 2006/0243855 A1 | 11/2006 | Pradier | |
| 2008/0119967 A1 * | 5/2008 | Long | G01G 19/07 702/101 |
| 2008/0147366 A1 * | 6/2008 | Schutz | G06T 17/05 703/8 |
| 2009/0064769 A1 * | 3/2009 | Davis | G01M 1/125 73/65.05 |
| 2010/0044515 A1 * | 2/2010 | Neto | G01M 1/127 244/135 C |
| 2010/0305767 A1 * | 12/2010 | Bengtson | F03D 7/047 709/248 |
| 2011/0226906 A1 * | 9/2011 | Spottiswoode | G01M 1/127 244/135 C |
| 2011/0301817 A1 * | 12/2011 | Hobenshield | E02F 9/26 345/1.3 |
| 2012/0136525 A1 * | 5/2012 | Everett | E02F 9/2045 701/50 |
| 2012/0215378 A1 * | 8/2012 | Sprock | G06Q 10/0639 701/2 |
| 2013/0037652 A1 | 2/2013 | Van Der Westhuizen | |
| 2013/0197792 A1 * | 8/2013 | Wolfram | G01C 23/00 701/124 |
| 2013/0226444 A1 * | 8/2013 | Johansson | H04W 4/023 701/300 |
| 2014/0336874 A1 * | 11/2014 | Harshberger, II | E02F 9/264 701/36 |
| 2014/0371899 A1 * | 12/2014 | Nagaoka | B23Q 3/18 700/170 |
| 2015/0100227 A1 | 4/2015 | Nance | |
| 2016/0086032 A1 * | 3/2016 | Pickett | G06T 1/0007 382/110 |
| 2016/0127871 A1 * | 5/2016 | Smith | H04W 4/02 455/456.6 |
| 2016/0140851 A1 * | 5/2016 | Levy | G08G 5/0034 701/410 |
| 2016/0152318 A1 | 6/2016 | Alexander | |
| 2016/0217694 A1 * | 7/2016 | Batla | G08G 5/0039 |
| 2016/0253908 A1 * | 9/2016 | Chambers | G08G 5/006 701/2 |
| 2016/0299116 A1 * | 10/2016 | Talmaki | G01S 5/02 |
| 2016/0371984 A1 * | 12/2016 | Macfarlane | G08G 5/0034 |
| 2017/0011340 A1 * | 1/2017 | Gabbai | G08G 5/0034 |
| 2017/0039764 A1 * | 2/2017 | Hu | G06T 19/003 |
| 2017/0076610 A1 * | 3/2017 | Liu | G08G 5/0069 |
| 2017/0180938 A1 * | 6/2017 | Smith | G01C 21/165 |
| 2017/0274988 A1 | 9/2017 | Nguyen et al. | |
| 2017/0316510 A1 * | 11/2017 | Hertz | G08G 5/0069 |
| 2018/0016767 A1 * | 1/2018 | Ge | E02F 9/205 |
| 2018/0075546 A1 * | 3/2018 | Richt | G06T 1/0007 |
| 2018/0106709 A1 * | 4/2018 | Cherney | B60P 1/00 |
| 2018/0120133 A1 * | 5/2018 | Blank | G01D 18/002 |
| 2018/0122020 A1 * | 5/2018 | Blank | A01D 41/127 |
| 2018/0132422 A1 * | 5/2018 | Hassanzadeh | A01C 21/005 |
| 2018/0143627 A1 * | 5/2018 | Lee | G08G 5/0013 |
| 2018/0146612 A1 * | 5/2018 | Sauder | A01B 79/005 |
| 2018/0216988 A1 * | 8/2018 | Nance | B64C 25/001 |

(56) References Cited

U.S. PATENT DOCUMENTS

| | | | |
|---|---|---|---|
| 2018/0293898 A1* | 10/2018 | Redmann | G08G 5/0013 |
| 2018/0354610 A1* | 12/2018 | Kneuper | B64C 17/10 |
| 2019/0069185 A1* | 2/2019 | Sinha | H04W 16/18 |
| 2019/0145794 A1* | 5/2019 | Ketchell, III | G01C 21/3667 |
| | | | 701/439 |
| 2019/0186984 A1* | 6/2019 | Nance | G01G 19/028 |
| 2019/0219437 A1* | 7/2019 | Gago Tripero | G01G 19/07 |
| 2019/0291883 A1* | 9/2019 | Atamanov | B64C 27/006 |
| 2019/0317489 A1* | 10/2019 | Hansman | G08G 5/0034 |
| 2019/0385174 A1* | 12/2019 | Nance | G01M 1/125 |
| 2020/0070952 A1* | 3/2020 | Beaufrere | B64C 13/16 |
| 2020/0070960 A1 | 3/2020 | Parker et al. | |
| 2020/0166401 A1 | 5/2020 | Reabe | |
| 2020/0192355 A1 | 6/2020 | Lu | |
| 2020/0216188 A1* | 7/2020 | Drancea | B64D 43/00 |
| 2020/0290742 A1 | 9/2020 | Kumar et al. | |
| 2020/0342274 A1 | 10/2020 | ElHattab et al. | |
| 2020/0342611 A1 | 10/2020 | ElHattab et al. | |
| 2020/0354170 A1* | 11/2020 | Priest | B64C 39/024 |

FOREIGN PATENT DOCUMENTS

| | | | |
|---|---|---|---|
| CN | 101927833 A | 12/2010 | |
| CN | 107506533 A | 12/2017 | |
| CN | 107782481 A | 3/2018 | |
| EP | 2 653 847 A2 | 10/2013 | |
| GB | 647642 A | 12/1950 | |
| WO | 2015/050935 A1 | 4/2015 | |

OTHER PUBLICATIONS

Final Office Action received for U.S. Appl. No. 16/539,424 dated Oct. 21, 2021, 13 pages.
European Search Report received for E.P Patent Application Serial No. 19194393.5 dated Feb. 7, 2020, 7 pages.
Office Action received for G.B. Patent Application Serial No. 1814286.9 dated Feb. 14, 2019, 7 pages.
Office Action received for G.B. Patent Application Serial No. 1814286.9 dated Sep. 22, 2020, 6 pages.
Office Action received for G.B. Patent Application Serial No. 1814286.9 dated Oct. 4, 2021, 3 pages.
Office Action received for G.B. Patent Application Serial No. 1814286.9 dated Feb. 24, 2022, 2 pages.
Extended European Search Report received for E.P Patent Application Serial No. 21167730.7 dated Nov. 25, 2021, 7 pages.
Office Action received for Chinese Patent Application Serial No. 201910823095.X dated Mar. 4, 2023, 18 pages.

* cited by examiner

MEASURING WEIGHT AND BALANCE AND OPTIMIZING CENTER OF GRAVITY

CROSS-REFERENCE TO RELATED APPLICATIONS

This patent application is a continuation of U.S. patent application Ser. No. 16/539,424, filed Aug. 13, 2019, entitled "MEASURING WEIGHT AND BALANCE AND OPTIMIZING CENTER OF GRAVITY," which application claims the benefit of earlier filing date and right of priority to United Kingdom Application No. 1814286.9, filed on Sep. 3, 2018, the contents of which applications are hereby expressly incorporated by reference herein in their entireties.

BACKGROUND

The subject disclosure relates to facilitating measuring weight and balance and optimizing center of gravity, and more specifically, facilitating non-contact measurements of weight and balance and automatically optimizing center of gravity.

SUMMARY

The following presents a summary to provide a basic understanding of one or more aspects of the invention. This summary is not intended to identify key or critical elements, or delineate any scope of the particular aspects or any scope of the claims. Its sole purpose is to present concepts in a simplified form as a prelude to the more detailed description that is presented later. In one or more aspects herein, devices, systems, computer-implemented methods, apparatus and/or computer program products that facilitate measuring weight and balance and optimizing center of gravity are described.

According to one aspect, a system is provided. The system can comprise a memory that stores computer executable components. The system can also comprise a processor, operably coupled to the memory, and that can execute computer executable components stored in the memory. The computer executable components can comprise a compression component that calculates compression of landing gear struts based on height above ground of an aircraft. The computer executable components can further comprise a gravity component that determines center of gravity based on differential compression of the landing gear struts. The computer executable components can further comprise an optimization component that automatically optimizes the center of gravity to a rear limit of a center of gravity margin.

According to another aspect, a computer-implemented method is provided. The computer-implemented method can comprise calculating, by a system operatively coupled to a processor, compression of landing gear struts based on height above ground of an aircraft. The computer-implemented method can further comprise determining, by the system, center of gravity based on differential compression of the landing gear struts. The computer-implemented method can further comprise automatically optimizing, by the system, the center of gravity to a rear limit of center of gravity margin.

According to another aspect, a computer program product facilitating measuring weight and balance and optimizing center of gravity is provided. The computer program product can comprise a computer readable storage medium having program instructions embodied therewith. The program instructions can be executable by a processor to cause the processor to calculate compression of landing gear struts based on height above ground of an aircraft. The program instructions can further be executable by a processor to cause the processor to determine center of gravity based on differential compression of the landing gear struts. The program instructions can further be executable by a processor to cause the processor to automatically optimize the center of gravity to a rear limit of a center of gravity margin.

DETAILED DESCRIPTION

Figure 1:
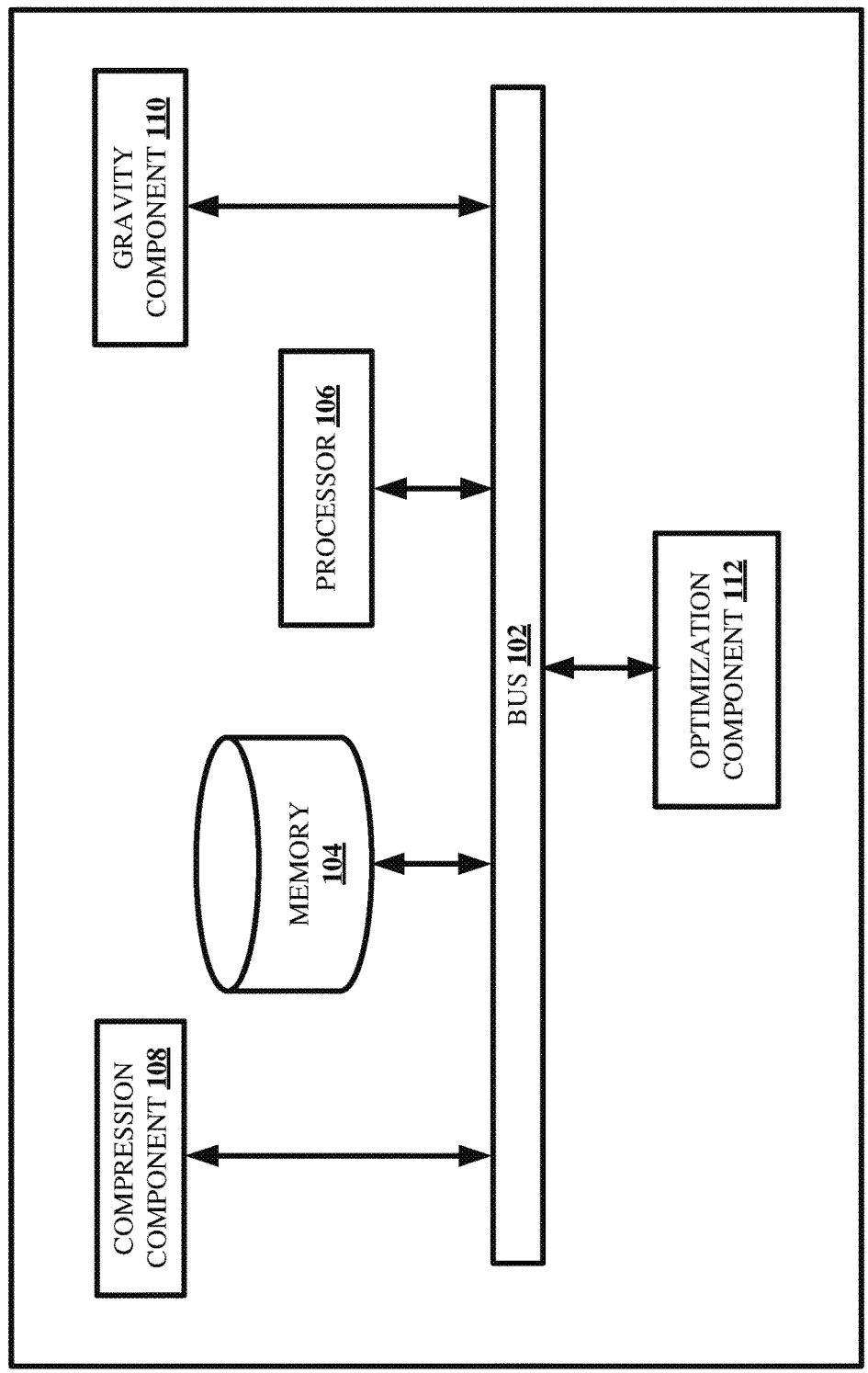
FIG. 1 illustrates a block diagram of an example, non-limiting system facilitating measuring weight and balance and optimizing center of gravity in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Center of gravity of an aircraft should be within a range (e.g., center of gravity range, center of gravity margin, center of gravity limits, etc.) that is safe for an aircraft to fly.

The term "aircraft" or "aircrafts" can mean all types of aircraft including fixed-wing, rotorcraft, manned aircraft or unmanned aerial vehicle (UAV). Center of gravity can be ahead of the aerodynamic center on fixed-wing aircrafts. For large aircrafts, location of center of gravity can be specified as percentage of the mean aerodynamic chord. Center of gravity on rotorcrafts (e.g., helicopters) and smaller aircrafts can be specified from a datum. Aircrafts can have longitudinal center of gravity limits (e.g., forward or aft) and lateral center of gravity limits (e.g., left or right). In helicopters, center of gravity does not only determine stability but also ability to control the aircraft as there can be limits to changing hub angle.

Aircrafts can have a center of gravity range defined by the manufacturer (e.g., 0% is the forward allowable position and 100% is the aft allowable position). When an aircraft goes supersonic, the aerodynamic center can move aft and the allowable range can be modified. Depending on position of center of gravity within the center of gravity margin, amount of deflection of control surfaces required to control the aircraft can increase or decrease. The more aft the center of gravity on center of gravity margin, the less deflection of control surfaces is required to control the aircraft. Decreasing deflection of control surfaces can decrease drag, which can result in less fuel required to thrust the aircraft forward (e.g., fuel efficiency). However, with a forward center of gravity at a front margin, large deflections can be required until sufficient force to control an aircraft cannot be generated, and at a rear margin, the aircraft becomes aerodynamically unstable, e.g., not self-correcting for perturbations and can require constant adjustment with very short reaction times. To optimize center of gravity, one or more embodiments described herein can automatically pump fuel between different fuel tanks to move and continuously optimize (e.g., adjust) center of gravity.

While on ground, one or more embodiments described herein can measure weight of an aircraft, determine center of gravity (e.g., balance) and optimize center of gravity while on ground and in flight. Sensors such as ultrasound, laser or radar can be used to measure height above ground at multiple locations of an aircraft, which can be used to calculate compression of landing gear struts. Additionally, or alternatively, sensors can also measure length or change in length of landing gear struts to calculate compression of landing gear struts. Total compression of landing gear struts can be used to calculate total weight and balance (e.g., center of gravity) of an aircraft using Young's modulus based on material properties of landing gear struts. Surface incline can be compensated by using airport surface incline maps. Onboard sensors can also be used to determine pitch of aircraft to determine center of gravity while on ground.

While in flight, one or more embodiments described herein can model flight performance to determine center of gravity in flight. Flight performance can be a function of angle (e.g., deflection) of flight control surfaces, engine settings, attitude, pitch, speed, etc. Depending on type of aircraft, flight performance can also be a function of tilt angle of a rotor. For example, embodiments described herein can compare deflection of flight control surfaces with speed, pitch, etc., to determine center of gravity.

FIG. 1 illustrates a block diagram of an example, non-limiting system 100 facilitating measuring weight and balance and optimizing center of gravity in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, etc., can cause the machines to perform the operations described. In various embodiments, the system 100 can be any type of component, machine, device, facility, apparatus, and/or instrument that comprises a processor. In some embodiments, system 100 is capable of effective and/or operative communication with a wired and/or wireless network.

As illustrated in FIG. 1, system 100 can comprise bus 102, memory 104, processor 106, compression component 108, gravity component 110 and/or optimization component 112. Bus 102 can provide for interconnection of various components of system 100. Memory 104 and processor 106 can carry out computation and/or storage operations of system 100 as described herein. It is to be appreciated that in some embodiments one or more system components can communicate wirelessly with other components, through a direct wired connection or integrated on a chipset.

In one or more embodiments described herein of system 100, predictive analytics can be used to automatically generate one or more models used by system 100 to facilitate automatically optimizing the center of gravity. For example, the automatic generation can be based on information retained in a knowledgebase. As used herein, the term "knowledgebase" can be a database or other storage location or repository that can store one or more types of information. All such embodiments are envisaged.

The knowledgebase can comprise information related to flight performance. In some embodiments, the information related to the flight performance can be gathered over time and retained in the knowledgebase. In some embodiments, information gathered can include location, size and shape of fuel tanks throughout an aircraft. Based on obtained information, system 100 can evaluate the knowledgebase (or multiple knowledgebases) and generate one or more patterns and/or can map information known about flight performance to information known about other flight performances. The predictive analytics of system 100 can determine that, if information of flight performance is similar to one or more other flight performances, models of the similar flight performances can be utilized to facilitate automatically optimizing the center of gravity.

The computer processing systems, computer-implemented methods, apparatus and/or computer program products described herein can employ hardware and/or software to generate models that are highly technical in nature, that are not abstract and that cannot be performed as a set of mental acts by a human. For example, one or more embodiments can perform lengthy and complex interpretation and analysis on a copious amount of available information to generate the models and determine which models from the one or more models should be utilized for a flight performance. In another example, one or more embodiments can perform predictive analytics on a large amount of data to facilitate automatically mapping different data types with a high level of accuracy, even in absence of detailed knowledge about flight performance. Accuracy can be evaluated by comparing a training set with a test set. After training a model employing a training set, accuracy can be calculated using a test set by computing percentage of output generated by the model running on the training set elements that matches a predicted target.

In various embodiments, compression component 108 can calculate compression of landing gear struts based on height above ground at multiple locations of an aircraft. Airport surface incline maps can also be employed to compensate the compression of the landing gear struts. Based on angle to a horizontal that the aircraft is pointing in, compression component 108 can calculate differential compression of the respective landing gear struts. Compression component 108 can also calculate total compression and differential compression of the landing gear struts based on change in length of individual landing gear struts. Total compression of the landing gear struts can be calculated based on change in height of the aircraft from ground. Total compression of the landing gear struts can also be calculated based on change in length of landing gear struts.

Gravity component 110 can determine center of gravity based on differential compression of the landing gear struts. The gravity component 110 can determine center of gravity by calculating difference in compression (e.g., differential compression) between nose landing gear struts and back landing gear struts (e.g., main landing gear struts, tail landing gear struts, etc.). If there is equal force between front landing gear struts and back landing gear struts, center of gravity is half way between the landing gears. A proportionally higher force on the back-landing gear struts can mean center of gravity is toward back of the aircraft. A proportionally higher force on nose landing gear struts can mean center of gravity is further forward towards front of the aircraft. If an aircraft is on a surface incline, gravity component 110 can also compensate surface incline in calculating center of gravity. Airport surface incline maps can provide surface incline information. It is appreciated that the gravity component 110 can determine both longitudinal and lateral center of gravity.

Gravity component 110 can also determine center of gravity based on attitude (e.g., pitch) of the aircraft. Onboard sensors can monitor attitude of aircraft which is an angle to horizontal that the aircraft is pointing in. Based on pitch of aircraft, compression component 108 can calculate differential compression, which gravity component 110 can employ to determine center of gravity while on ground.

Center of gravity can be moved within center of gravity margin for fuel efficiency. Front limit (e.g., forward limit) of center of gravity margin has a 0% margin. Rear limit (e.g. back limit, aft limit, etc.) of center of gravity has a 100% margin. An aircraft flying with center of gravity towards rear limit of center of gravity margin has better fuel efficiency than an aircraft flying with center of gravity towards front limit. If center of gravity is towards front limit of center of gravity margin, significant control input (e.g., deflection of flight control surfaces) can be required to control the aircraft. Greater deflections can increase drag experienced by an aircraft which in turn can require more fuel for the same velocity. To offset amount of drag, more thrust is typically required to maintain speed which corresponds to greater fuel expenditure. If center of gravity is towards rear limit of center of gravity margin, a small input to flight control surfaces or an external input can have greater effect on how the aircraft is moving. By using less control input over duration of a flight, significant fuel savings can be achieved.

For example, with center of gravity towards rear limit of center of gravity margin, if a pilot desires to change an elevator to change pitch, the pilot can change the elevator at a small angle to have a large effect. Also, with an aft center of gravity, less drag is generated requiring less fuel to propel an aircraft at equal speed. If center of gravity is very far forward, the pilot would need to deflect the elevator a greater amount to make changes. A greater amount of deflection to the control surfaces can create more drag and require more fuel to maintain speed by offsetting the drag with thrust.

Safety is also a concern for maintaining the center of gravity within the center of gravity margin both on ground and in flight. While on ground, if the center of gravity is too far forward, the aircraft may not be able to create sufficient force to lift the aircraft nose up for takeoff. An aircraft that does not takeoff can hit an end of the runway. If center of gravity is too far back, the nose can be lifted for takeoff, however, the aircraft may be successively less stable and cannot be controlled as soon as it lifts off into air. Ideally, center of gravity should be at the rear limit because the aircraft is still controllable but has less drag than towards the front limit of center of gravity margin. With center of gravity as far back as allowable, a small deflection of control surfaces can change attitude or orientation of the aircraft. Smaller deflection can result in fuel efficiency because there is less drag. The center of gravity can be optimized by pumping fuel for optimal center of gravity and fuel efficiency. Typically, the most rear point within center of gravity margin is preferable because minimal control forces are required. Center of gravity can be optimized for takeoff run; and center of gravity can also be optimized in flight for fuel efficiency.

Optimization component 112 can automatically optimize center of gravity to rear limit of center of gravity margin. The optimization component 112 can automatically optimize center of gravity by pumping fuel to optimize fuel efficiency in flight by considering location, size and shape of fuel tanks throughout the aircraft. Optimization component 112 can also automatically optimize center of gravity by pumping fuel to optimize fuel efficiency for takeoff by considering location, size and shape of fuel tanks throughout the aircraft. The optimization component 112 can pump fuel between different fuel tanks to move center of gravity into a most optimal position possible for fuel efficiency during takeoff and while in air where most time is spent flying. For example, some aircrafts can have around fourteen fuel tanks of different shapes and sizes distributed throughout the aircraft. There can be several fuel tanks in wings, in the fuselage, in the tail, etc. It can be a difficult decision for a pilot to decide where to pump fuel from the respective fuel tanks to optimize center of gravity. The optimization component 112 can utilize flight plan information to predict aircraft performance and plan fuel pumping accordingly. For example, the optimization component 112 can access flight plan information and determine predicted rate of fuel burn to ensure fuel is in the most optimal tanks, although that does not always mean the most rear limit center of gravity position at 100% margin. More specifically, if an aircraft goes supersonic and changes the allowable center of gravity range, the optimization component 112 can access this information from the flight plan and move internal weight (e.g., pump fuel) prior to this change to ensure the new limits are abided. It is appreciated that the optimization component 112 can optimize both longitudinal and lateral center of gravity.

The optimization component 112 can automatically control center of gravity to keep the aircraft at an optimal position for fuel efficiency. It is appreciated that the most optimal center of gravity may not always be at 100% margin but as close to 100% margin as possible. For example, if center of gravity can easily shift backward, an optimal center of gravity may have to be a little forward of 100% margin for safety reasons so as to not risk moving forward pass 100% margin. Additionally, manufacturers can also define the center of gravity range of an aircraft to within a range that is greater than 0% and lesser than 100%. The optimization component 112 can continuously adjust (e.g., optimize) center of gravity by pumping fuel based on continuous feedback (e.g., by the gravity component 110 while on ground) of the location of the center of gravity. For example, the optimization component 112 can pump fuel between the different fuel tanks in the wings, at the center in the fuselage and in the tail. It is appreciated that the optimization component 112 can optimize the center of gravity for any type of aircraft based on continuous feedback of the location of the center of gravity.

Figure 2:
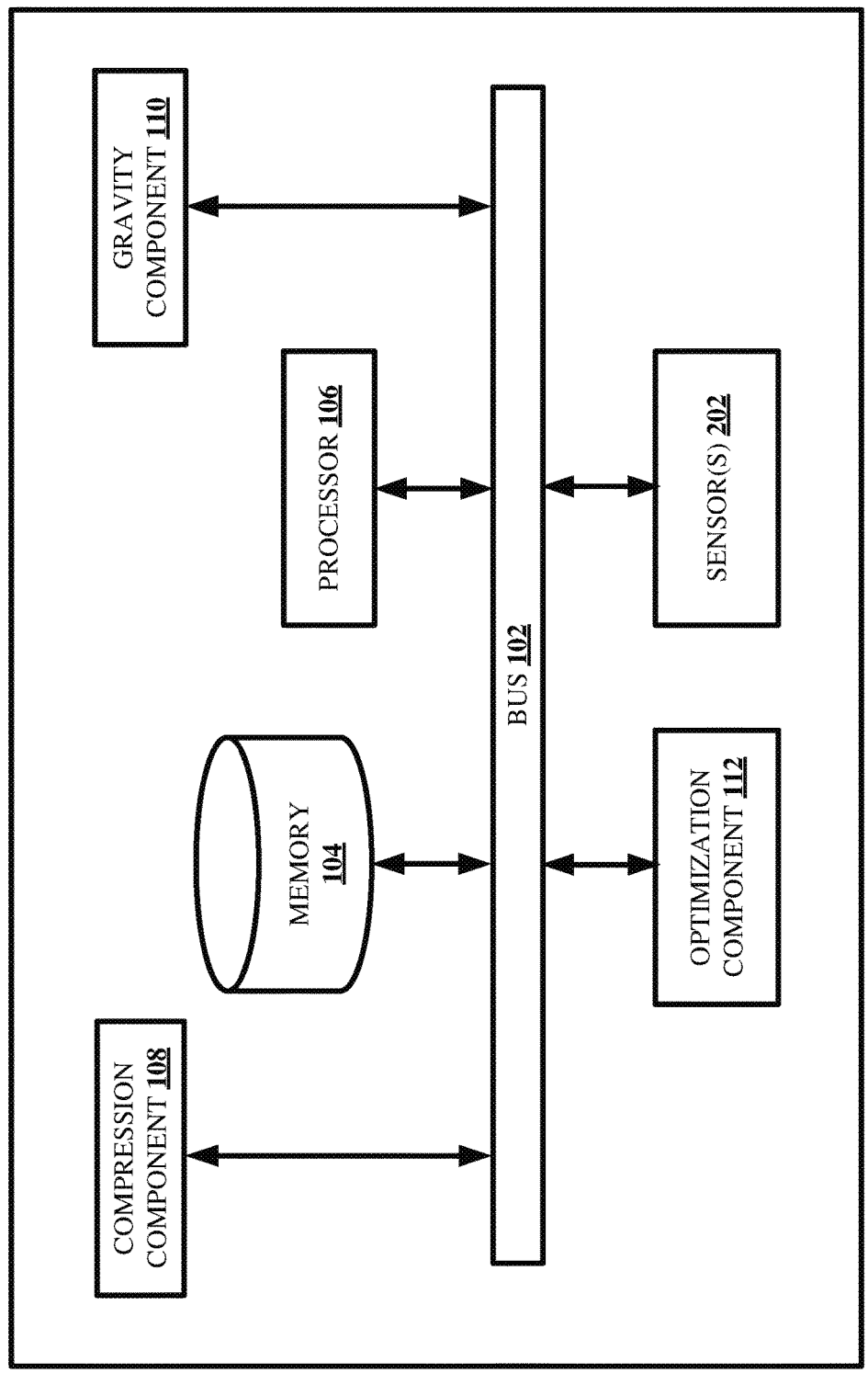
FIG. 2 illustrates a block diagram of an example, non-limiting system facilitating measuring weight and balance and optimizing center of gravity including one or more sensors in accordance with one or more embodiments described herein.

FIG. 2 illustrates a block diagram of an example, non-limiting system 100 facilitating measuring weight and balance and optimizing center of gravity including one or more sensors 202 in accordance with one or more embodiments described herein. Repetitive description of like elements employed in other embodiments described herein is omitted for sake of brevity. It is appreciated that the term "sensors 202" as used herein can mean one or more sensors. The sensors 202 can measure height above ground at multiple locations of the aircraft. The sensors 202 can also be used to measure change in length of landing gear struts (e.g., the original length and the compress length upon loading the aircraft). The sensors 202 can be ultrasound, laser, radar, etc., that can make no-contact measurements. For example, sensors 202 can make measurements optically without being attached to the landing gears, which can sustain quite a shock during landing. Life of the sensors 202 can be prolonged by not being attached to the landing gear struts because of the shock during landing and the dirty environment.

Based on the measurements by sensors 202, compression component 108 can calculate differential compression and total compression of landing gear struts. The compression component 108 can calculate differential compression and total compression of the landing gear struts based on distance above ground at multiple locations of the aircraft as measured by the sensors 202. Compression component 108 can also calculate differential compression and total compression of the landing gear struts based on change in length of landing gear struts measured by the sensors 202. Airport surface incline maps can be used by the compression component 108 to compensate compression of the landing gear struts. The differential compression calculated by the compression component 108 can be used to by the gravity component 110 to determine the center of gravity. Additionally, or alternatively, the sensors 202 can also be attitude sensors to measure the attitude (e.g., pitch, angle, etc.) of the aircraft both on the ground and in the air for determining the center of gravity. For example, the gravity component 110 calculate the center of gravity based on the aircraft pitch by factoring in the airport surface incline. The total compression calculated by the compression component 108 can be used by the weight component 302 to calculate the weight of the aircraft by using the material property (e.g., Young's modulus) of the landing gear struts.

The landing gear struts can have components that deflect a lot and components that deflect a little. So, the sensors 202 can be installed to measure over components that can have meaningful measurements. For example, if a component is very long and has a small deflection relative to its length, then it will not provide a very meaningful measurement. Instead, if a subsection of that component has a larger deflection relative to its length, it can provide a more meaningful measurement. The compression component 108 can calculate the total compression of all the landing gear struts (e.g., nose landing gear, main landing gears, tail landing gear, etc.). If the material property (e.g., Young's modulus) of the landing gears are known, the weight component 302 can calculate the force or weight that caused that deflection.

Figure 3:
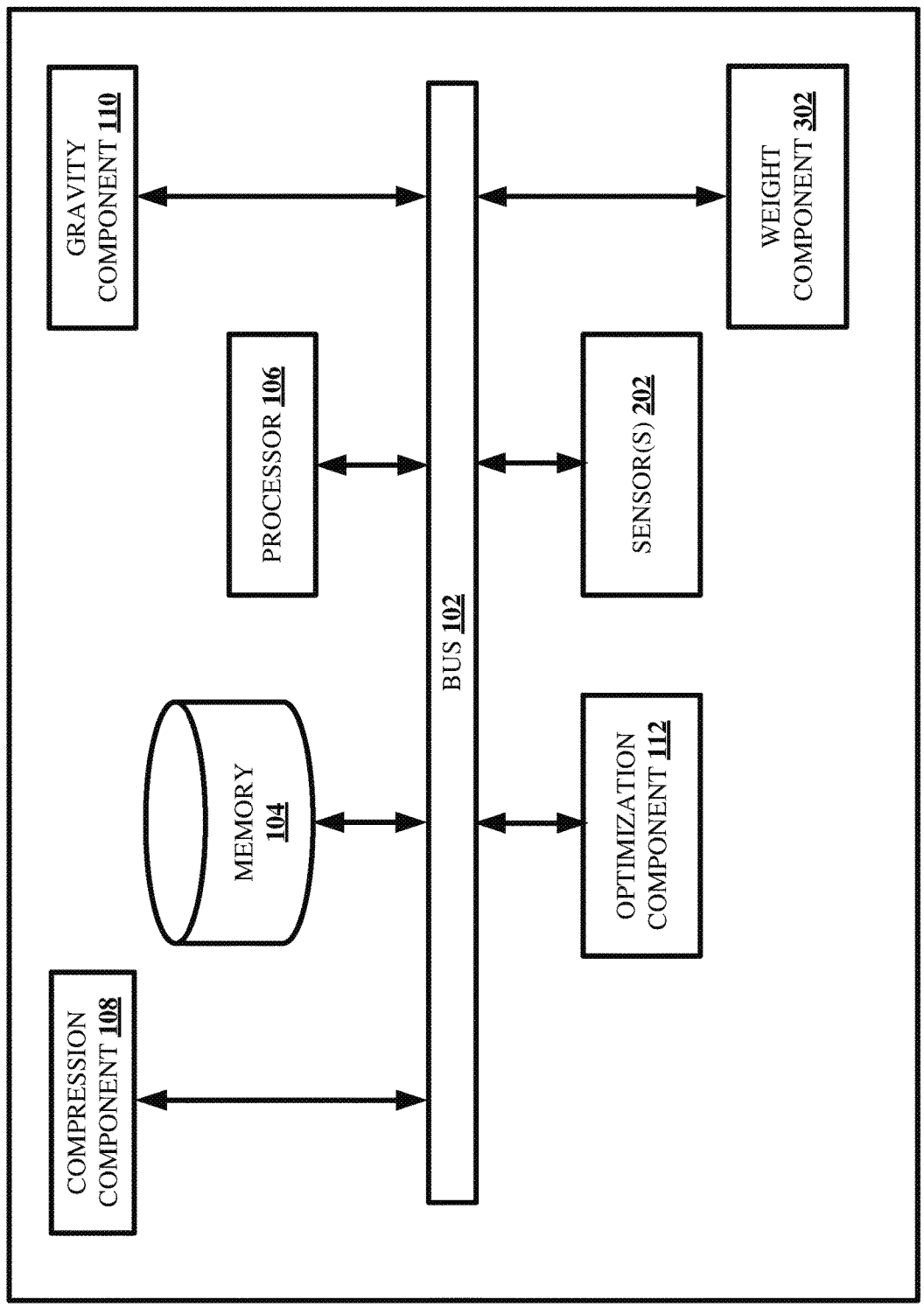
FIG. 3 illustrates a block diagram of an example, non-limiting system facilitating measuring weight and balance and optimizing center of gravity including a weight component in accordance with one or more embodiments described herein.

FIG. 3 illustrates a block diagram of an example, non-limiting system 100 facilitating measuring weight and balance and optimizing center of gravity including a weight component 302 in accordance with one or more embodiments described herein.

Repetitive description of like elements employed in other embodiments described herein is omitted for sake of brevity. Weight component 302 can calculate the total weight of the aircraft based on the total compression. The compression component 108 can calculate the compression for the different landing gear struts. Total weight of the aircraft can be calculated by the weight component 302 based on the total compression of all the landing gear struts. More specifically, by using the material property (e.g., Young's modulus) of the landing gear struts, the total weight can be calculated based on the total compression of the landing gear struts.

The sensors 202 can measure the height above ground at multiple locations of the aircraft for determining the total compression. The sensors 202 can also measure the change in length of the landing gear struts (e.g., original length and compressed length) for determining (e.g., via the compression component 108) the compression of the landing gear struts and the total compression of all the landing gear struts. The weight component 302 can calculate the weight of the aircraft based on the total compression calculated by the compression component 108. The weight component 302 can also determine whether the total weight has reached maximum weight capacity. The weight component 302 can also determine whether the aircraft is within weight capacity limits and by how much. If the total weight is over the weight capacity limits, a notification can be automatically sent to the flight crew or cabin crew. In addition, a notification can also be automatically sent to the flight crew or cabin crew for out of range center of gravity.

Figure 4:
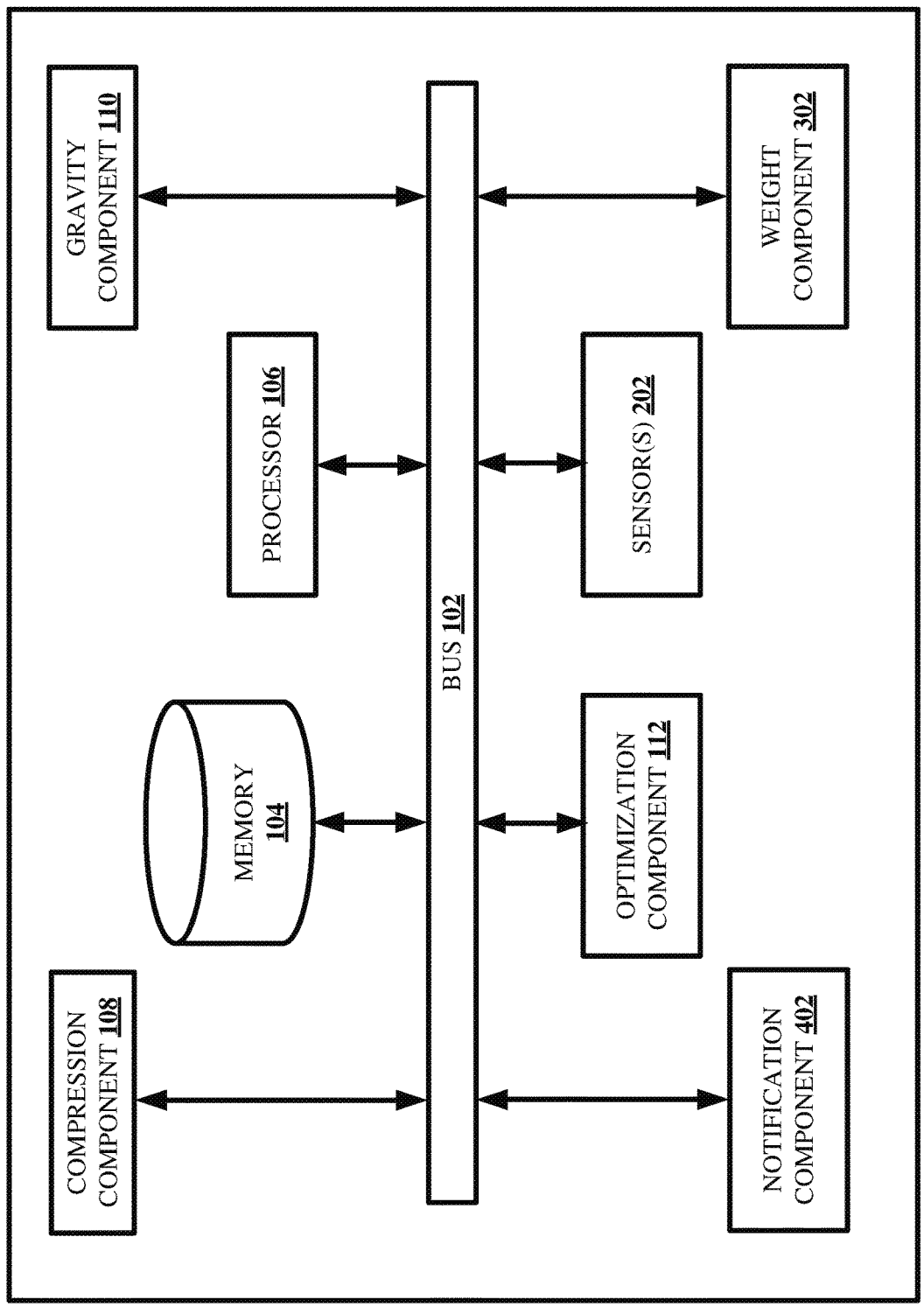
FIG. 4 illustrates a block diagram of an example, non-limiting system facilitating measuring weight and balance and optimizing center of gravity including a notification component in accordance with one or more embodiments described herein.

FIG. 4 illustrates a block diagram of an example, non-limiting system 100 facilitating measuring weight and balance and optimizing center of gravity including a notification component 402 in accordance with one or more embodiments described herein.

Repetitive description of like elements employed in other embodiments described herein is omitted for sake of brevity. The notification component 402 can automatically notify the flight crew or the cabin crew if the total weight of the aircraft is over the weight capacity limits or if center of gravity is out of range. For example, the weight component 302 can calculate total weight of the aircraft and determine whether the aircraft is over weight capacity limits. If the aircraft is over the weight capacity limits, the weight component 302 can send the weight information to notification component 402 to alert the flight crew or the cabin crew. The notification component 402 can alert the flight crew or the cabin crew that the aircraft has reached maximum weight capacity limits or that the aircraft is over the weight capacity limits and by how much. The notification component 402 can also provide the weight of the aircraft to the flight crew or the cabin crew upon request.

Figure 5:
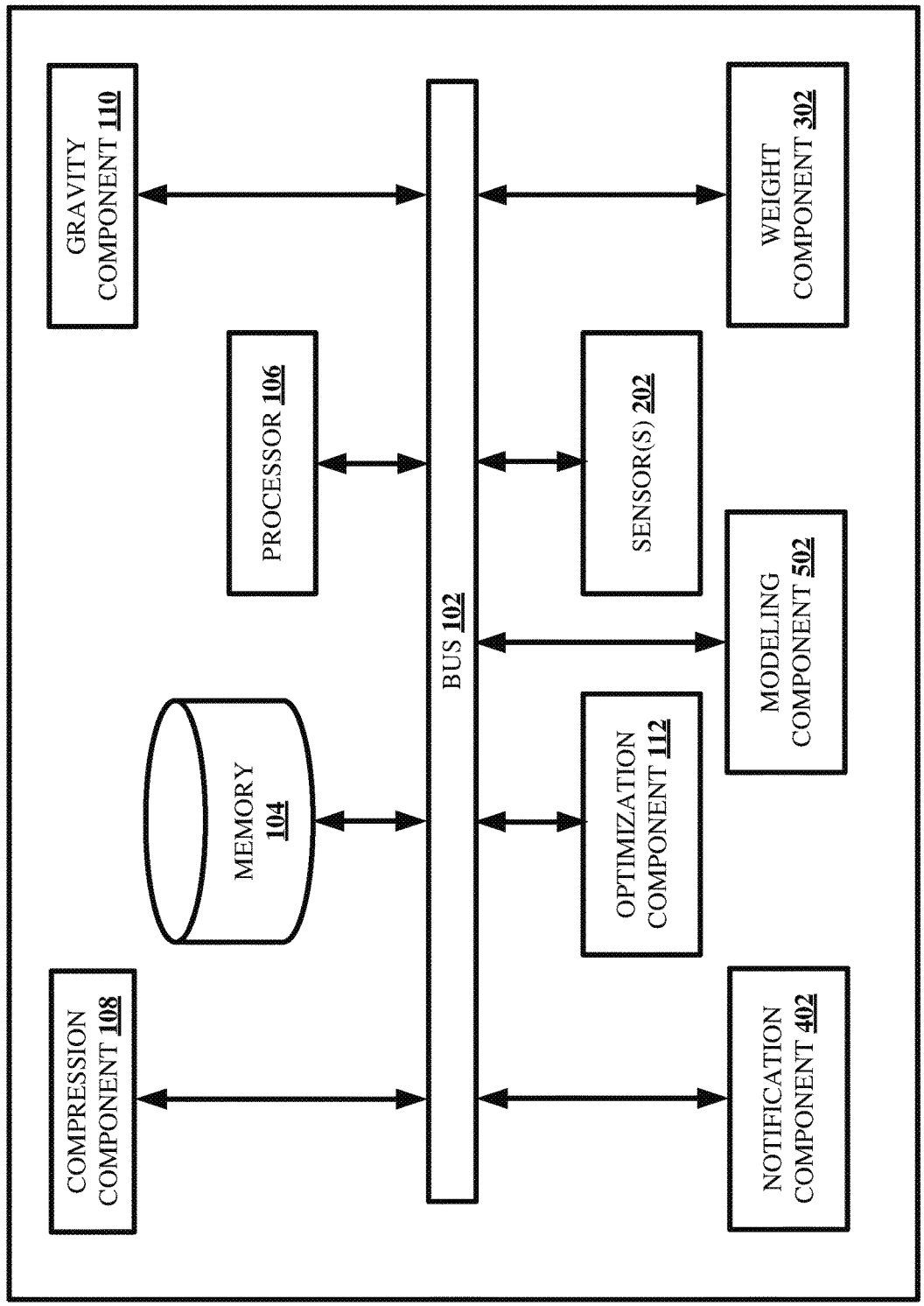
FIG. 5 illustrates a block diagram of an example, non-limiting system facilitating measuring weight and balance and optimizing center of gravity including a modeling component in accordance with one or more embodiments described herein.

FIG. 5 illustrates a block diagram of an example, non-limiting system 100 facilitating measuring weight and balance and optimizing center of gravity including a modeling component 502 in accordance with one or more embodiments described herein.

Repetitive description of like elements employed in other embodiments described herein is omitted for sake of brevity. The modeling component 502 can model flight performance to determine the center of gravity in flight. So, in addition to the gravity component 110 calculating the center of gravity based on the differential compression of the landing gear struts or based on the pitch of the aircraft while on ground, the modeling component can also model the flight performance to determine the center of gravity in flight and whether the center of gravity is optimal (e.g., closest possible to 100% margin within the center of gravity margin). The modeling component 502 can model the flight performance of the aircraft based on the pitch, the deflection of the flight control surfaces, the engine settings, fuel use, etc., to determine the expected speed of the aircraft. The modeling component 502 can compare the expected speed of the aircraft with the actual speed of the aircraft to determine the center of gravity in flight because speed is affected by the amount of deflection of the flight control surfaces, which is related to the center of gravity. The amount of deflection of the flight control surfaces necessary is dependent on the position of the center of gravity. Alternatively, the center of gravity can be verified by comparing the expected with actual settings for the flight control surfaces while in flight. While in flight, the modeling component 502 can also compare the actual fuel use with the expected fuel use to determine the center of gravity because more fuel is used with a greater amount of deflection of the flight control surfaces due to increased drag. The modeling component 502 can also use other parameters to determine location of center of gravity while in flight. The modeling component 502 can use aircraft attitude, airspeed, engine settings, flight control surface deflections, aerodynamic model, etc., to back calculate center of gravity and weight required for the actual settings. The modeling component 502 can also access the predicted rate of fuel burn information (e.g., determined by the optimization component 112 by accessing flight plan information), wind conditions and information on how fuel can be continuously pumped (e.g., via the optimization component 112) throughout different tanks to affect center of gravity. For example, the modeling component 502 can provide a better estimate on fuel use to fly to a destination as it has a better expectation on fuel burn.

The modeling component 502 can determine where the center of gravity is in terms of the center of gravity margin. The center of gravity can be anywhere on the aircraft, but to be able to fly safely, the center of gravity should be within a certain range called the center of gravity margin that the aircraft is certified to be in. Anything behind the center of gravity margin means the aircraft is unstable. Anything forward of the center of gravity margin, and the aircraft is overly stable that it would require too much control input (e.g., deflection of the flight control surfaces) to control it. If the center of gravity is at 0% of the center of gravity margin, the center of gravity is at the absolute maximum forward that is allowed. If the center of gravity is at 100% of the center of gravity margin, the center of gravity is at the furthest back position allowable.

As soon as the aircraft takeoff and begin to have aerodynamic performance (e.g., in flight, in the air, etc.), the modeling component 502 can begin to analyze the flight control surfaces, flight performance, engine settings, speed, attitude, fuel use, etc., to determine the center of gravity. The modeling component 502 can continuously and automatically determine the center of gravity and send that data to the optimization component 112. The optimization component 112 can automatically and continuously optimize the center of gravity for fuel efficiency based on the continuous feedback of the center of gravity information from the modeling component 502. The optimization component 112 can optimize (e.g., adjust, move, etc.) the center of gravity by pumping fuel between the different fuel tanks.

Figure 6:
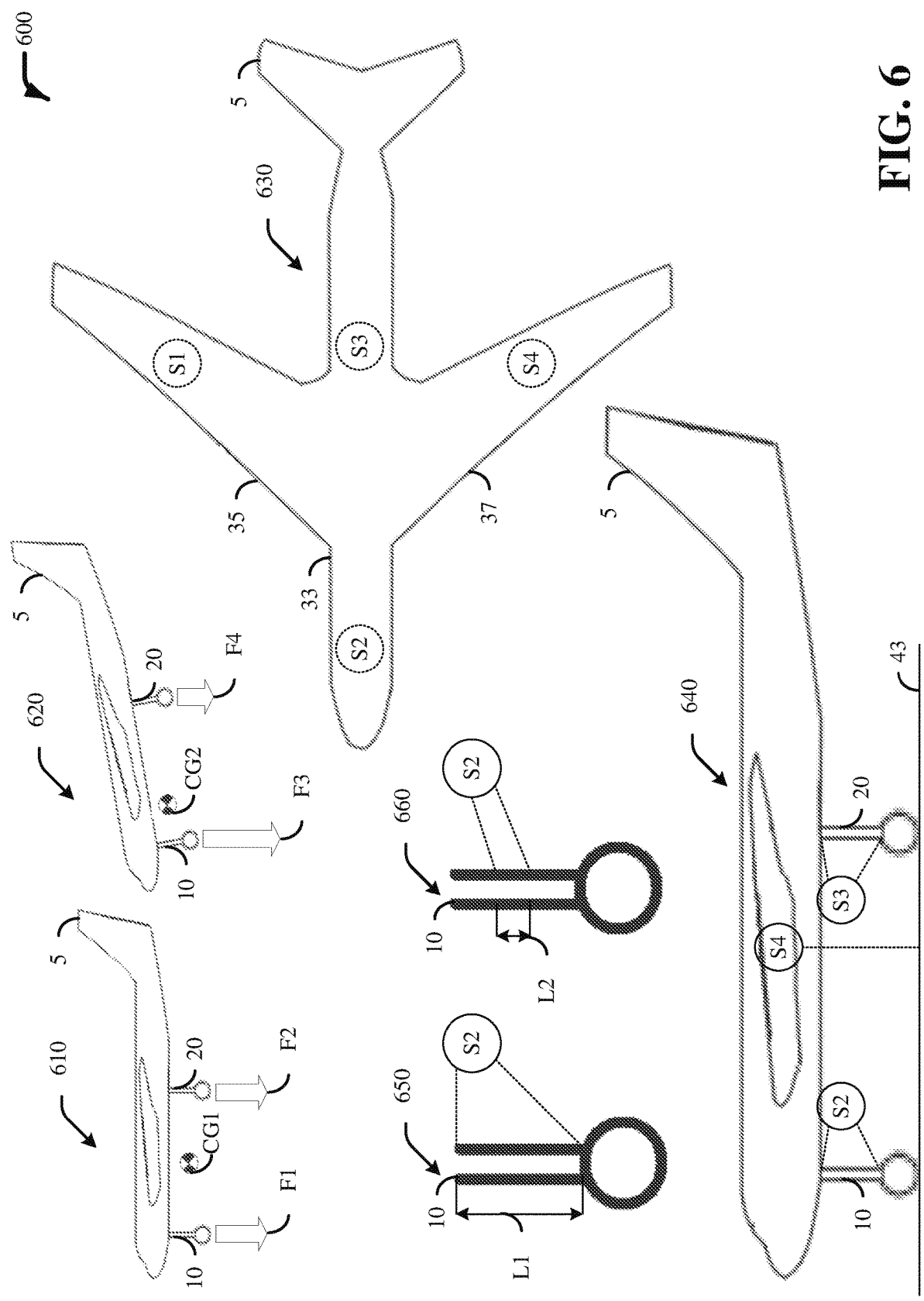
FIG. 6 illustrates example, non-limiting principle facilitating measuring weight and balance and optimizing center of gravity in accordance with one or more embodiments described herein.

FIG. 6 illustrates example, non-limiting principle 600 facilitating measuring weight and balance and optimizing center of gravity in accordance with one or more embodiments described herein. Repetitive description of like elements employed in other embodiments described herein is omitted for sake of brevity. Image 610 and image 620 depict principle of determining total weight and position of center of gravity. Image 610 illustrates an aircraft having center of gravity CG1 equally between landing gear 10 and landing gear 20. Force F1 and force F2 illustrate the forces on front landing gear 10 and rear landing gear 20 in image 610, respectively. The sum of force F1 and force F2 equals the total weight (e.g., mass) of the aircraft 5. Image 620 illustrates center of gravity CG2 is moved towards the front of aircraft 5 making aircraft 5 tilt slightly forward. Force F3 on front landing gear 10 is higher than force F4 on rear landing gear 20. However, the total force of force F3 and force F4 is the same as the total force of force F1 and force F2.

Image 630 and image 640 illustrate example location of sensors. Image 630 illustrates sensor 2 and sensor 3 placed under fuselage 33. Sensor 1 and sensor 4 are placed under wing 35 and wing 37, respectively. Image 640 illustrates a sideview of aircraft 5 showing sensor 4 measuring height above ground 43. Sensor 2 is trained on front landing gear 10, and sensor 3 is trained on rear landing gear 20. Sensor 2 and sensor 3 can be cameras or lidar sensors measuring the length of front landing gear 10 and rear landing gear 20, respectively. Sensor 1 and sensor 4 can be radar sensors or ultrasound sensors measuring height above ground 43.

Image 650 and image 660 depict principle of measuring strain and selecting field of measurement. Image 650 illustrates sensor 2 capturing the entire length L1 of front landing gear 10 as it tries to measure a small change of length over the entire length L1 of front landing gear 10, e.g., strain. Strain can be defined as the change in length divided by the original length (dL/L). Material property (e.g., Young's modulus) can be used to calculate the strain for a given stress (e.g., force over a cross-section), which can be used to calculate the force (e.g., mass) resting on front landing gear 10. The force resting on rear landing gear 20 can be calculated the same way as well. The sum of the force resting on front landing gear 10 and rear landing gear 20 is equal to the total weight (e.g., mass) of aircraft 5. Image 660 illustrates sensor 2 trained at a portion of length L2 of front landing gear 10 to provide a higher resolution to measure strain, and also, to train on a softer material (e.g., higher strain to be measured).

Figure 7:
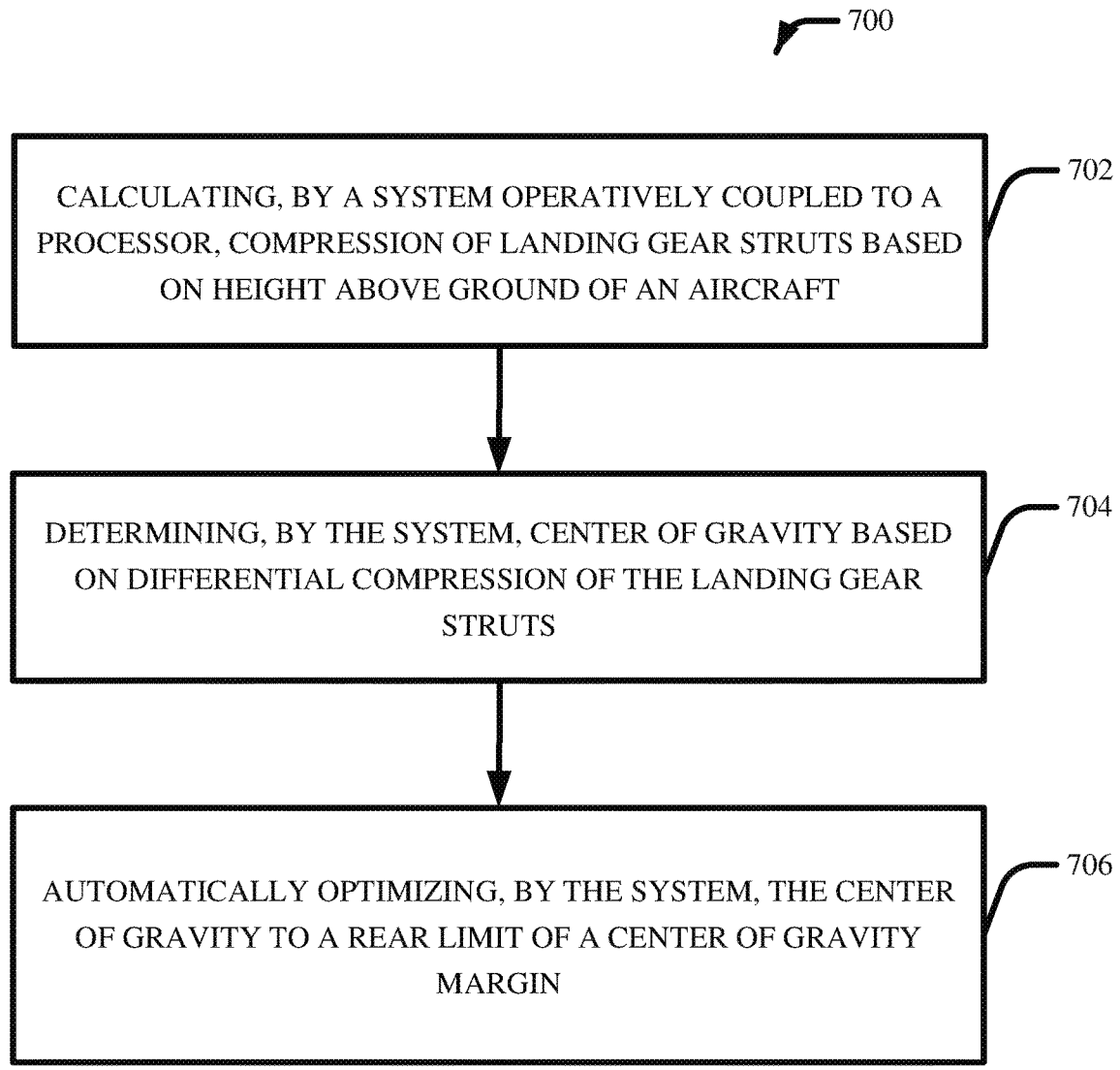
FIGS. 7-10 illustrate block diagrams of example, non-limiting computer-implemented methods facilitating measuring weight and balance and optimizing center of gravity in accordance with one or more embodiments described herein.

FIG. 7 illustrates a block diagram of an example, non-limiting computer-implemented method 700 facilitating measuring weight and balance and optimizing center of gravity in accordance with one or more embodiments described herein. Repetitive description of like elements employed in other embodiments described herein is omitted for sake of brevity. At 702, the computer-implemented method 700 can comprise calculating (e.g., via the compression component 108), by a system operatively coupled to a processor, compression of landing gear struts based on height above ground of an aircraft. At 704, the computer-implemented method 700 can comprise determining (e.g., via the gravity component 110), by the system, center of gravity based on differential compression of the landing gear struts. At 706, the computer-implemented method 700 can comprise automatically optimizing (e.g., via the optimization component 112), by the system, the center of gravity to a rear limit of a center of gravity margin.

Figure 8:
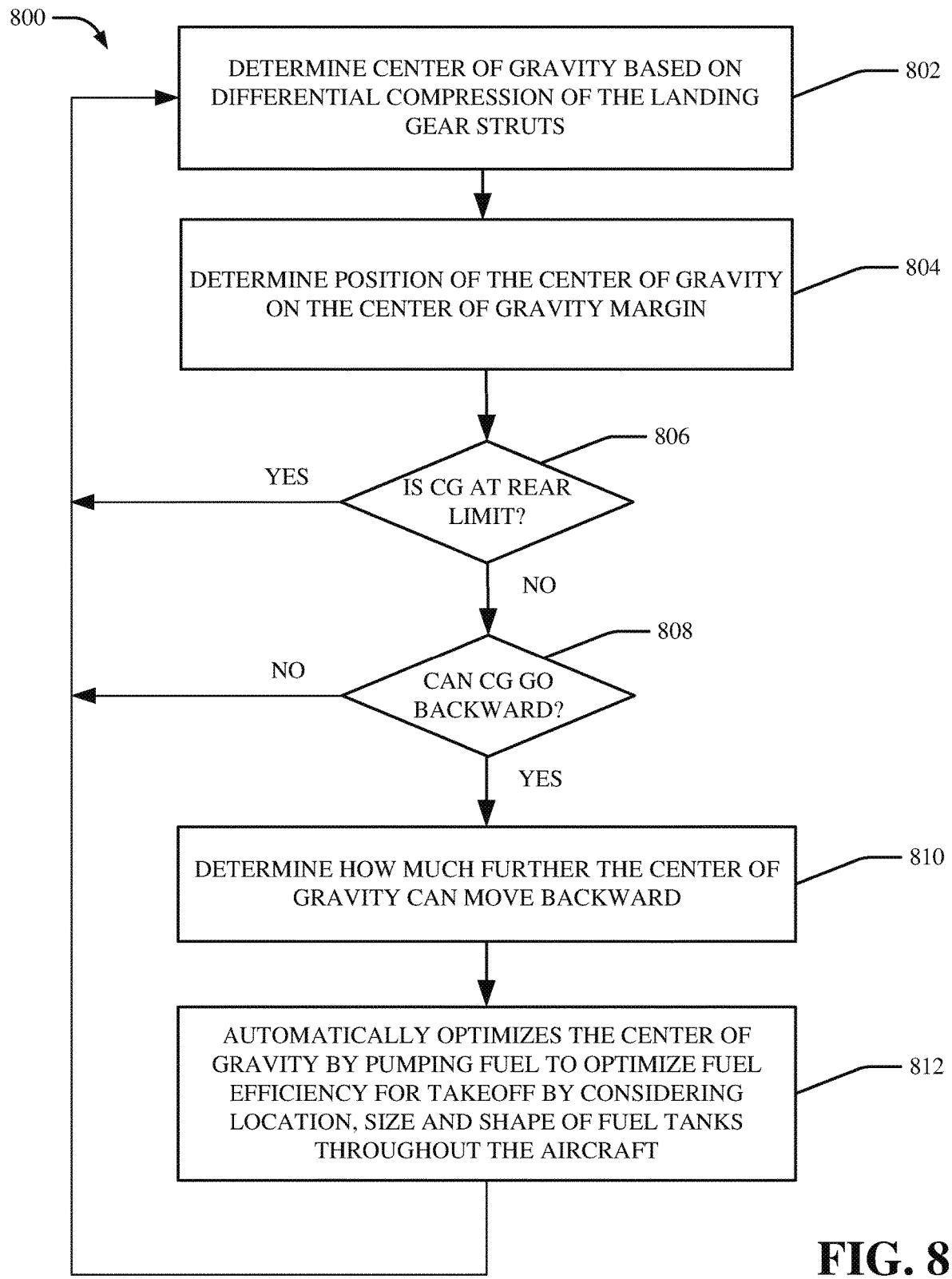

FIG. 8 illustrates a block diagram of an example, non-limiting computer-implemented method 800 facilitating measuring weight and balance and optimizing center of gravity in accordance with one or more embodiments described herein. Repetitive description of like elements employed in other embodiments described herein is omitted for sake of brevity. While on the ground, the gravity component 110 can determine the center of gravity based on differential compression. Differential compression can be calculated (e.g., via the compression component 108) based on measurements (e.g., via the sensors 202) of height above ground at different locations of the aircraft. Differential compression can also be calculated (e.g., via the compression component 108) based on the change in measurements (e.g., via the sensors 202) of the landing gear struts.

At 802, the computer-implemented method 800 can comprise determining (e.g., via the gravity component 110) center of gravity based on differential compression of the landing gear struts. At 804, the computer-implemented method 800 can comprise determining (e.g., via the gravity component 110) position of the center of gravity on the center of gravity margin. At 806, the computer-implemented method 800 can comprise determining (e.g., via the gravity component 110) whether the center of gravity is at the rear limit of the center of gravity margin. If yes, the process returns to 802. If no, the process proceeds to 808. At 808, the computer-implemented method 800 can comprise determining (e.g., via the gravity component 110) whether the center of gravity can go further backward. If no, the process returns to 802. If yes, the process proceeds to 810. At 810, the computer-implemented method 800 can comprise determining (e.g., via the gravity component 110) how much further the center of gravity can move backward. At 812, the computer-implemented method 800 can comprise automatically optimizing (e.g., via the optimization component 112) the center of gravity by pumping fuel to optimize fuel efficiency for takeoff by considering location, size and shape of fuel tanks throughout the aircraft.

Figure 9:
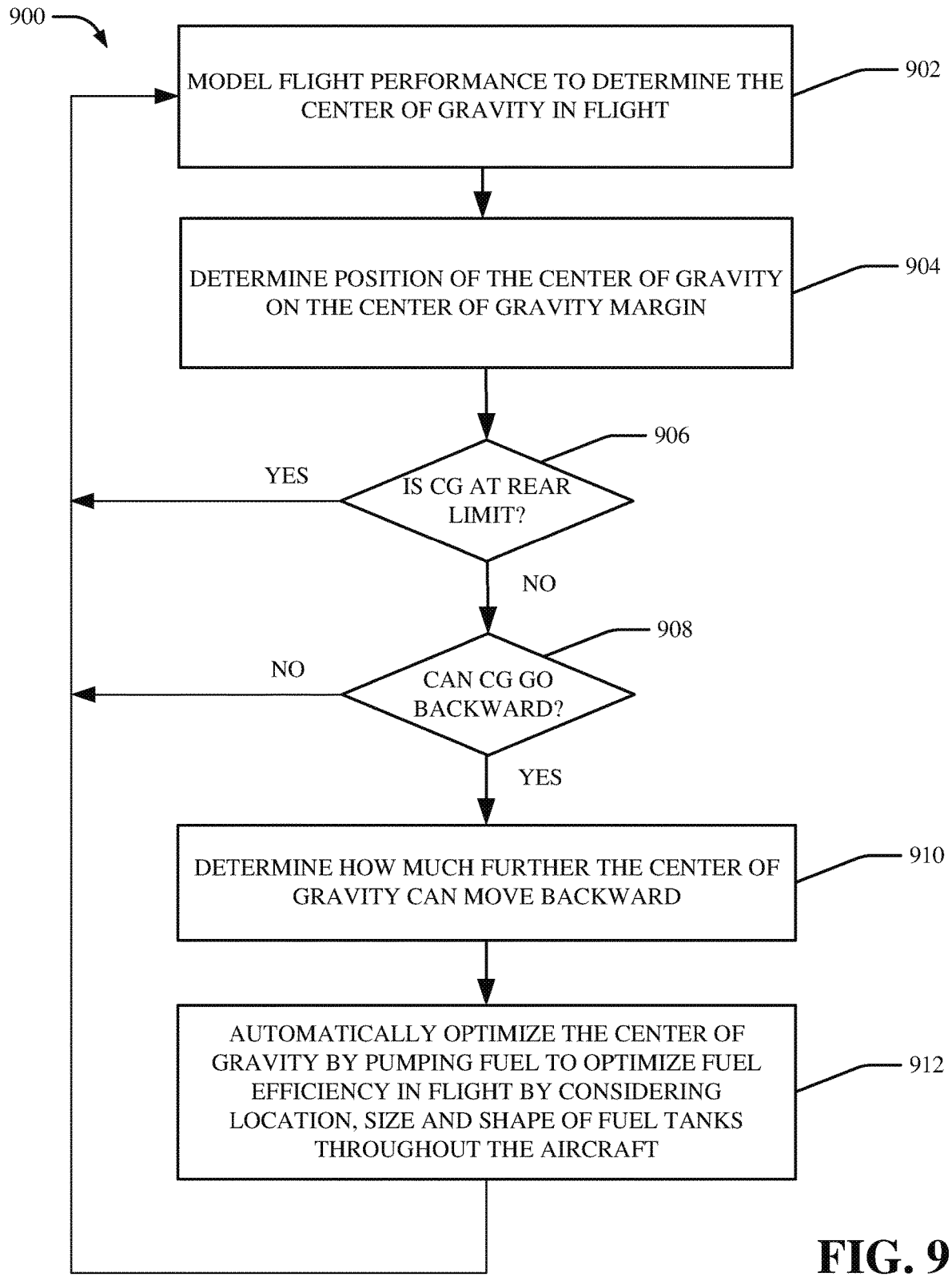

FIG. 9 illustrates a block diagram of an example, non-limiting computer-implemented method 900 facilitating measuring weight and balance and optimizing center of gravity in accordance with one or more embodiments described herein. Repetitive description of like elements employed in other embodiments described herein is omitted for sake of brevity. While in flight, the modeling component 502 can model the flight performance to determine the center of gravity. Depending on the type of aircraft, the flight performance can be the angle of the deflection of the flight control surfaces, tilt angle of the rotor, engine settings, speed, fuel use, attitude, pitch, etc.

At 902, the computer-implemented method 900 can comprise modeling (e.g., via the modeling component 502) flight performance to determine the center of gravity in flight.

At 904, the computer-implemented method 900 can comprise determining (e.g., via the modeling component 502) position of the center of gravity on the center of gravity margin. At 906, the computer-implemented method 900 can comprise determining (e.g., via the modeling component 502) whether the center of gravity is at the rear limit of the center of gravity margin. If yes, the process returns to 902. If no, the process proceeds to 908. At 908, the computer-implemented method 900 can comprise determining (e.g., via the modeling component 502) whether the center of gravity can go further backward. If no, the process returns to 902. If yes, the process proceeds to 910. At 910, the computer-implemented method 900 can comprise determining (e.g., via the modeling component 502) how much further the center of gravity can move backward. At 912, the computer-implemented method 900 can comprise automatically optimizing (e.g., via the optimization component 112) the center of gravity by pumping fuel to optimize fuel efficiency in flight by considering location, size and shape of fuel tanks throughout the aircraft.

Figure 10:
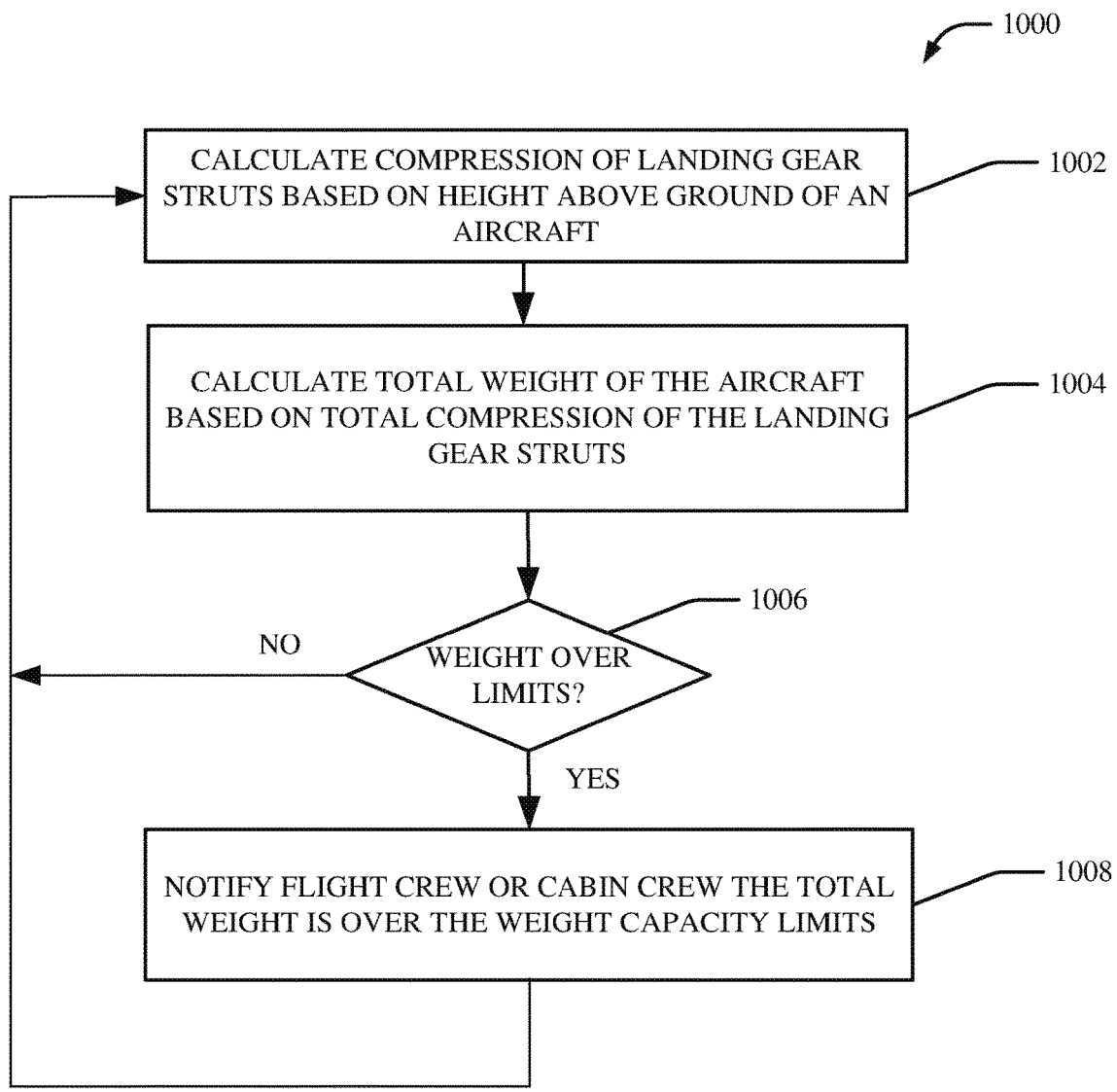

FIG. 10 illustrates a block diagram of an example, non-limiting computer-implemented method 1000 facilitating measuring weight and balance and optimizing center of gravity in accordance with one or more embodiments described herein. Repetitive description of like elements employed in other embodiments described herein is omitted for sake of brevity. At 1002, the computer-implemented method 1000 can comprise calculating (e.g., via the compression component 108) compression of landing gear struts based on height above ground of an aircraft. At 1004, the computer-implemented method 1000 can comprise calculating (e.g., via the weight component 302) total weight of the aircraft based on total compression of the landing gear struts. At 1006, the computer-implemented method 1000 can comprise determining (e.g., via the weight component 302) whether the total weight is over the weight capacity limits. If no, the process returns to 1002. If yes, the process proceeds to 1008. At 1008, the computer-implemented method 1000 can comprise notifying (e.g., via the notification component 402) flight crew or cabin crew the total weight is over the weight capacity limits.

Figure 11:
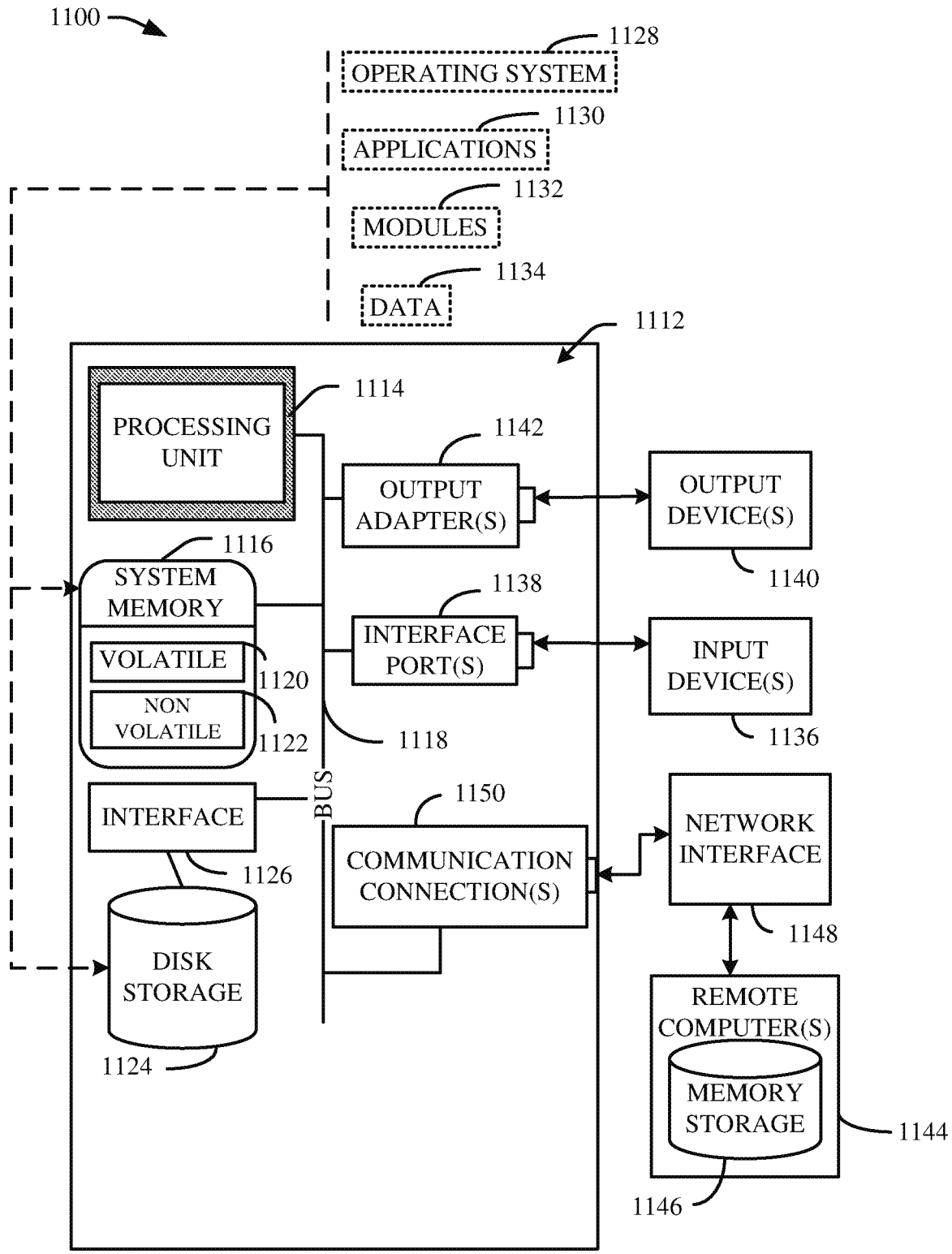
FIG. 11 illustrates a block diagram of an example, non-limiting operating environment in which one or more embodiments described herein can be facilitated.

To provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc., that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining a center of gravity of an aircraft during flight based on a flight performance model of the aircraft;
   automatically adjusting a position of the center of gravity of the aircraft based on a transfer of fuel between fuel tanks of the aircraft based on the position of the center of gravity as compared to a center of gravity margin of the aircraft;
   utilizing flight plan information to predict changes to the center of gravity margin; and
   generating a fuel pumping plan based on the changes to the center of gravity margin.

2. The computer-implemented method of claim 1, wherein the transfer of fuel comprises evaluating at least one of respective locations, respective sizes, and respective shapes of the fuel tanks throughout the aircraft.

3. The computer-implemented method of claim 1, wherein the automatically adjusting comprises:
   comparing the center of gravity to a rear limit of the center of gravity margin.

4. The computer-implemented method of claim 1, wherein the automatically adjusting comprises:
   based on the center of gravity being determined to not be at a rear limit of the center of gravity margin, determining whether the center of gravity can go further backward toward a rear position of the aircraft.

5. The computer-implemented method of claim 4, further comprising:
   based on a determination that the center of gravity can go further backward toward the rear position of the aircraft, determining how much further the center of gravity can move backward toward the rear position of the aircraft, resulting in an adjusted center of gravity; and
   readjusting the position of the center of gravity to the adjusted center of gravity.

6. The computer-implemented method of claim 1, wherein the flight performance model is a function of one or more of: angle of deflection of flight control surfaces, engine settings, speed, fuel use, attitude, and pitch.

7. The computer-implemented method of claim 1, wherein the flight performance model is a function of a tilt angle of a rotor.

8. The computer-implemented method of claim 1, wherein the automatically adjusting comprises determining an expected aircraft performance based on flight plan information.

9. The computer-implemented method of claim 8, further comprising determining an expected rate of fuel burn based on the flight plan information, wherein the transfer of fuel is based on the expected rate of fuel burn.

10. The computer-implemented method of claim 1, wherein the determining the center of gravity comprises comparing an expected speed of the aircraft with an actual speed of the aircraft.

11. A system comprising:
a memory that stores computer executable components; and
a processor, operably coupled to the memory, that executes the computer executable components stored in the memory, wherein the computer executable components comprise:
a modelling component configured to:
determine a center of gravity of an aircraft during flight by modelling flight performance of the aircraft, and
determine a position of the center of gravity relative to a center of gravity margin of the aircraft; and
an optimization component configured to automatically adjust the position of the center of gravity by pumping fuel between fuel tanks of the aircraft to optimize fuel efficiency during flight, wherein the automatically adjusting further utilizes flight plan information to predict aircraft performance and to plan fuel transfer according to the predicted aircraft performance.

12. The system of claim 11, wherein the pumping fuel comprises pumping the fuel based on respective locations, respective sizes, and respective shapes of the fuel tanks throughout the aircraft.

13. The system of claim 11, wherein the modelling component is further configured to:
continually determine the center of gravity, resulting in information indictive of a determined center of gravity; and
send the information indictive of the determined center of gravity to the optimization component.

14. The system of claim 11, wherein the optimization component is configured to continuously and automatically adjust the center of gravity for fuel efficiency based on feedback of determined center of gravity information from the modelling component.

15. The system of claim 11, wherein the modelling component is configured to model the flight performance of the aircraft based on one or more parameters selected from a group of parameters consisting of: angle of deflection of flight control surfaces, tilt angle of a rotor, engine settings, speed, fuel use, attitude, and pitch.

16. The system of claim 11, wherein the modelling component is configured to access one or more of a predicted rate of fuel burn information, wind conditions, and information on how fuel can continuously be pumped by the optimization component throughout different tanks to affect the center of gravity.

17. A non-transitory machine-readable medium, comprising executable instructions that, when executed by a processor, facilitate performance of operations, comprising:
determining, based on a flight performance model of an aircraft, a center of gravity of the aircraft during flight;
utilizing flight plan information to predict a change to a center of gravity margin of the aircraft during a flight; and
adjusting a position of the center of gravity of the aircraft based on the position of the center of gravity as compared to the predicted center of gravity margin of the aircraft prior to the change to the center of gravity margin, wherein the adjusting comprises transferring fuel between fuel tanks of the aircraft.

18. The non-transitory machine-readable medium of claim 17, wherein the operations further comprise:
based on a first determination that the center of gravity is not at a rear limit of the center of gravity margin and a second determination that the center of gravity can go further backward toward a rear position of the aircraft, determining how much further the center of gravity can move backward toward the rear position of the aircraft, resulting in an adjusted center of gravity; and
readjusting the position of the center of gravity to the adjusted center of gravity.

19. The non-transitory machine-readable medium of claim 17, wherein the determining the center of gravity comprises comparing an expected speed of the aircraft with an actual speed of the aircraft.

20. The non-transitory machine-readable medium of claim 17, wherein the adjusting comprises determining an expected aircraft performance based on flight plan information, and wherein the operations further comprise:
determining an expected rate of fuel burn based on the flight plan information, wherein the transferring the fuel is based on the expected rate of fuel burn.

* * * * *